United States Patent [19]
Dion

[11] 4,381,505
[45] Apr. 26, 1983

[54] SYSTEM FOR DISPLAYING ALPHANUMERICAL MESSAGES HAVING STORED AND REAL TIME COMPONENTS

[75] Inventor: Warren E. Dion, Terryville, Conn.

[73] Assignee: The Arthur G. Russell Company, Incorporated, Bristol, Conn.

[21] Appl. No.: 214,643

[22] Filed: Dec. 10, 1980

[51] Int. Cl.³ ............................................. G09G 3/00
[52] U.S. Cl. .................................... 340/756; 340/524; 340/286 R; 340/706; 340/760
[58] Field of Search .......... 340/524, 525, 691, 286 M, 340/711, 760, 792, 706, 756–765, 286 R

[56] References Cited

U.S. PATENT DOCUMENTS

| | | | |
|---|---|---|---|
| 3,432,846 | 3/1969 | Jones et al. | 340/760 |
| 3,925,779 | 12/1975 | Gerstenhaber | 340/711 |
| 3,932,859 | 1/1976 | Kyriakides | 340/711 |
| 4,212,003 | 7/1980 | Mishoe et al. | 340/691 |

*Primary Examiner*—Marshall M. Curtis

*Attorney, Agent, or Firm*—McCormick, Paulding & Huber

[57] ABSTRACT

A system for displaying alphanumeric messages has a display device with a row of character stations at each of which a character may be created for display in response to a set of signals applied to the character station. A memory device stores a plurality of message fragments and a real time means provides a plurality of real time message fragments respectively representing a corresponding plurality of real time conditions. A control circuit in response to certain input conditions selects one stored message fragment and one real time message fragment and converts them to sets of signals applied in one to one relationship to the character stations to cause the display of a meaningful complete message by the display device. The memory may also store some complete messages which are convertible by the control circuit, without any input from the real time means, into sets of signals which are applied in one to one relationship to the character stations of the display device to cause the display of a meaningful complete message.

15 Claims, 2 Drawing Figures

SYSTEM FOR DISPLAYING ALPHANUMERICAL MESSAGES HAVING STORED AND REAL TIME COMPONENTS

BACKGROUND OF THE INVENTION

This invention relates to a system for displaying alphanumerical messages by means of a visual display having a row or other plurality of character stations at each of which a character may be produced by the application thereto of a set of binary coded signals, and deals more particularly with such a display system wherein each displayed message may be either one derived entirely from an associated memory or one consisting in part of a message fragment derived from the memory and in part of a message fragment representing a real time condition and derived from a sensor or other device providing a real time output.

The multiple character station display device used in the system of this invention may be any one of a number of different types of such devices wherein each character station includes a number of segments switchable between visible and nonvisible states and arranged so as to permit the generation of any one of a set of alphanumeric characters by making visible different combinations of the segments. Examples of such display devices are Nixie tube displays, light emitting diode (LED) displays, liquid crystal displays (LCD) and vacuum fluorescent displays.

In order to accommodate a reasonably large number of character stations in the display device it is known to multiplex the input signals to the character stations. In such a multiplexing scheme time is divided into repetitive time frames each containing a number of time slots equal to the number of character stations and with each time slot being assigned to a respective one of the display stations. During each time frame sets of binary coded signals representing the characters to be displayed at the various display stations are applied in sequence to a character buss, with the signals intended for a particular character station being applied to the buss during the station's time slot, and the character stations are synchronously enabled during their time slots to receive from the character buss the set of binary coded signals intended for them. In the past, the source of binary coded signals applied to a character buss to create displayed messages has generally been a memory or other message storing means so that the displayed messages have been limited to ones which have somehow been established well in advance of their display.

It is also well known to employ multiple character display devices for displaying the instantaneous values of real time variables such as the time of day, or the pressure, temperature, flow rate, RPM or the like existing at some point in an industrial process, but in such cases the display device is usually permanently associated with a single variable or, if it is capable of being switched to any one of a number of variables, does not include the display of any identifying or informative characters in addition to the ones representing the instantaneous value of the selected variable.

The present invention has as its object the provision of a display system wherein a single multiple character display device may be used to selectively display either messages derived entirely from a memory or messages made up in part of stored message fragments and in part of message fragments derived from real time devices. Thus, for example, the display system may be used in conjunction with an automatic controller for an industrial process and, in accordance with different conditions monitored by the controller, may display complete stored messages advising an operator of the conditions of various aspects of the controlled process, such messages perhaps giving warnings of departures from normal or perhaps giving instructions to the operator for actions to be taken on his part to bring the process back to normal or to otherwise keep it running properly. Additionally, the controller may periodically or at other appropriate times cause the display device to show the instantaneous values of various real time variables existing in the controlled process with each such displayed value having associated with it an informative legend or other supporting multiple character message fragment. In such an application the automatic controller for the involved process makes the selection of messages displayed by the display device; however, the display system of the invention is not limited to such a situation and may be used with various different other kinds of message selecting means.

Other objects and advantages of the invention will be apparent from the following detailed description of the preferred embodiments thereof and from the accompanying drawings.

SUMMARY OF THE INVENTION

The invention resides in a message display system including as the display device a vacuum fluorescent display, an LED display, an LCD display, or the like having a plurality of character stations at each of which any one of a given set of characters may be displayed by the application to the station of a set of binary coded signals. Associated with the display device is a memory and a real time signal means, such as a plurality of sensors, associated with a plurality of real time conditions. The memory stores a plurality of multple character stored message fragments and the real time signal means provides a selection of real time message fragments each corresponding to a respective one of the real time conditions. A message selector selects one of the stored message fragments and one of the real time message fragments and an associated routing means applies the two selected message fragments to the display device to cause it to display a complete message made up in part of the stored message fragment and in part of the real time message fragment.

The invention also resides in the memory's additionally storing one or more complete messages and in the message selector and routing means being operable to allow such complete stored message to be selected and displayed by the display device.

Still more specifically the invention resides in the real time signal means presenting the selected real time message fragment in the form of one or more binary coded decimal digits and in the memory including one message address serving to decode such binary coded decimal digits into binary signals coded in the same code as other characters output from the memory.

DETAILED DESCRIPTION OF THE PREFERRED EMBODIMENTS

Figure 1:
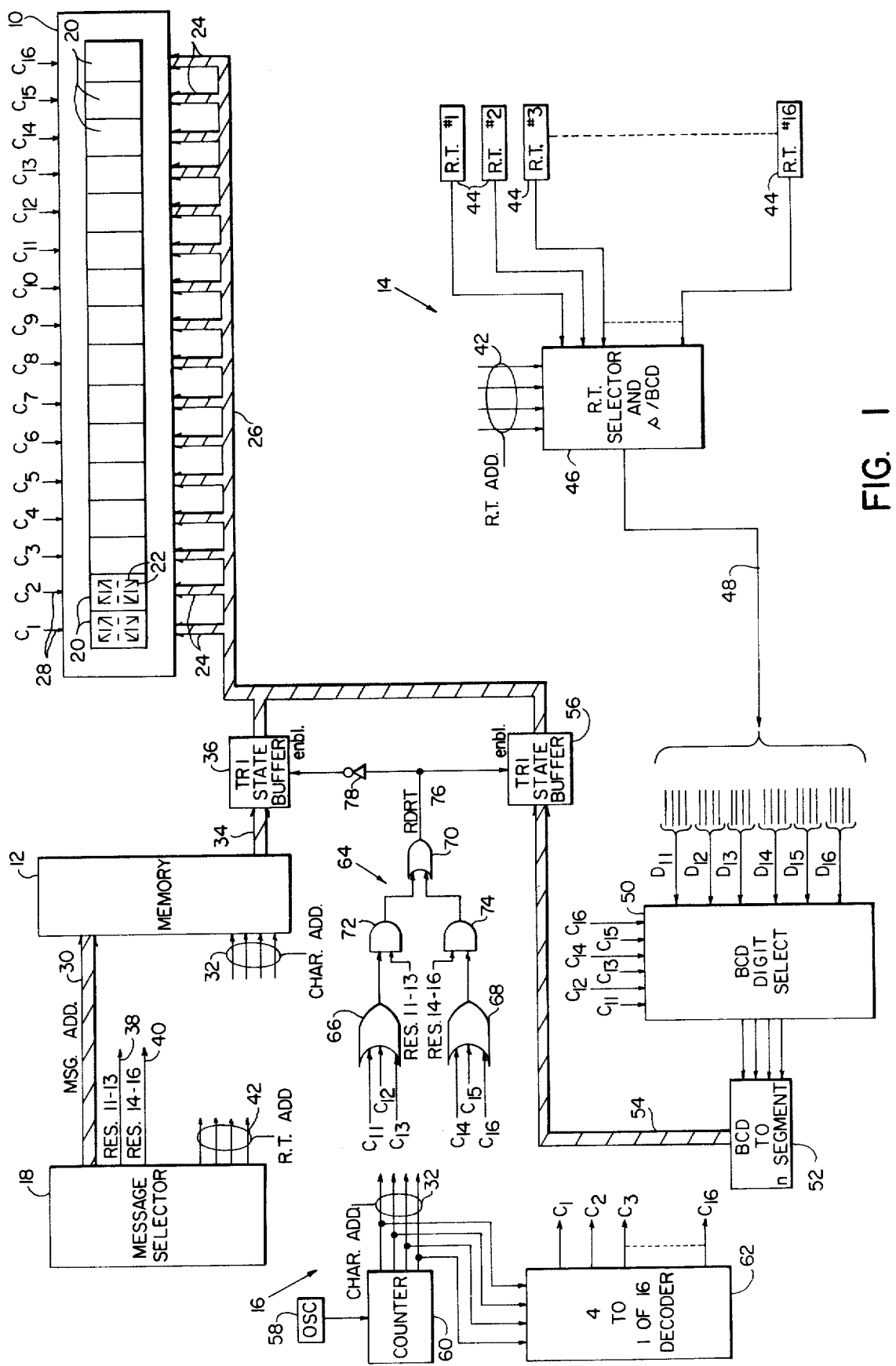
FIG. 1 is a block diagram showing schematically a display system embodying this invention.

Turning to FIG. 1, a message display system embodying the invention comprises basically a multiple character display device 10, a memory 12 which stores various messages, a real time signal means 14 providing a selection of real time message fragments, a clock means 16 and a message selector 18.

The particular display device used in any given embodiment of the invention may vary widely and it may for example be an LED display, a Nixie tube display, an LCD display or a vacuum fluorescent display. In any event, it has a plurality of character display stations each having a number of display segments or elements which are switchable between illuminated and non-illuminated states, or otherwise between visible and non-visible states, and arranged so that by illuminating or making visible various combinations of the segments different alphanumerical characters may be generated. The number of character display stations and the number of display segments at each station may also vary without departing from the invention. By way of example, however, the illustrated display device 10 has sixteen character display stations 20, 20 and is a vacuum fluorescent display wherein each display station 20 has nineteen display segments 22, 22. As indicated in the two left-most display stations, sixteen of these segments 22, 22 are arranged as shown to accommodate the generation of any one of a relatively large set of alphanumeric characters and three other elements, not shown, are provided at each display station for accommodating the generation of a comma, an apostrophe and a period.

In accordance with the broader aspects of the invention, each character display station 20 of the display device has a set of input terminals or its equivalent, indicated at 24, through which a binary signal having a number of bits equal to the number of display segments 22, 22 of each station is made available to the display station, and all of the sets 24, 24 of input terminals are connected to or are part of a character buss 26; and each display station 20 also has an associated enable terminal 28 which when supplied with an enabling signal gates the binary coded signal when appearing at the associated input terminal set 24 to the display station to cause the illumination or the otherwise making visible of display segments 22, 22 in the combination dictated by the input binary coded signal. In the case of the illustrated vacuum fluorescent display 10 each display segment 22 is an anode segment, and corresponding anode segments of all of the display stations are electrically connected together to provide nineteen anode terminals, nineteen being the number of display segments of each display station, so that such nineteen anode terminals from the illustrated character buss 26; and each display station has its own individual grid with a terminal constituting its illustrated enable terminal 28.

The memory 12 may take various different forms and stores a number of messages each assigned a number of character storage locations equal in number to the number of character display stations of the display device 10. Thus, in the illustrated case, for each stored message the memory 12 has sixteen character storage locations. The stored messages are selected by a binary coded message address signal supplied on a multiple conductor address line 30 and applied to address terminals of the memory 12. The individual character locations of a selected message are in turn selected by a character address signal supplied by a four conductor character address line 32 connected to four corresponding address terminals of the memory. Therefore, at any given instant of time the message address signal (MSG. ADD.) supplied on the line 30 selects a given message stored in the memory 12 and the character address signal (CHAR. ADD.) supplied on the line 32 selects a particular one of the sixteen character locations of the selected message. The information stored at the character location so selected is output from the memory on a multiple conductor output line 34 in the form of a nineteen bit coded binary signal and such output signal is supplied to the character buss 26 through a tri-state buffer 36 when such buffer is enabled by an enabling signal as hereinafter described.

The messages stored in the memory 12 include at least one where all of the sixteen associated character locations of the memory store information to be displayed by the display device 10 and also include at least one message where some of the associated character locations of the memory do not store characters to be displayed by the device 10. Messages containing display information at all sixteen of their character locations are referred to as "complete stored messages", and messges containing display information at less than all of their sixteen character locations are referred to as "stored message fragments".

In FIG. 1 the sixteen character display stations 20, 20 of the display 10 are number 1 to 16 going from left to right and the sixteen character locations of each message stored in the memory are correspondingly numbered 1 to 16. The length of a stored message fragment may vary in different embodiments but in the embodiment of FIG. 1 it may be either thirteen characters long or ten characters long. More specifically, for each stored message either three or six of the display stations of the display 10 may be reserved for the display of real time information and when such stations are reserved no meaningful information is stored in the corresponding character locations of the memory. Such reservation is indicated by reserve signals appearing on lines 38 and 40 and produced by the message selector 18. The "RES 11-13" signal when it appears on the line 38 reserves display stations 11, 12 and 13 for the display of real time data and the "RES 14-16" signal when it appears on the line 40 reserves display stations, 14, 15 and 16 for the display of real time data. When both reserve signals appear at the same time all six display stations 11 to 16 are reserved for the display of real time data.

The message selector 18 selects the message to be displayed by the display device 10. This is done by outputting a binary coded message address signal (MSG. ADD.) on the address line 30 which addresses a given complete message or message fragment stored in the memory 12. The message selector also provides, when required, reserve signals on the lines 38 and 40 and a binary coded real time address signal (R. T. ADD.) on a four conductor real time address line 42. When the message selector addresses a complete stored message in the memory 12 it also produces no reserve signals on the reserve signal lines 38 and 40. When the message selector addresses a stored message fragment in the memory 12 a reserve signal appears on the line 38, or on the line 40, or on both lines 38 and 40 depending on the particular character stations to be reserved, and at the same time the message selector provides the real time address line 42 with a binary coded real time address signal (R. T. ADD.) for selecting the real time data to be supplied to the reserved display stations of the display device 10 as hereinafter described in more detail.

The message selector 18 may be implemented in many different ways without departing from the scope of the invention. As an example it may be part of an automatic controller or monitoring device for a manufacturing, material handling, chemical or other industrial process. In accordance with different conditions monitored by the controller, the controller may operate to select messages from the memory 12 which when displayed by the device 10 advises an operator of the state of a monitored condition, provides a warning, gives an instruction or the like, or the controller may also select a message fragment from the memory 12 to which is added real time data from the real time signal means 14.

The real time signal means 14 has a number of devices providing real time data representing the value of real time variables or other associated real time conditions. In FIG. 1 sixteen such real time devices are indicated at 44, 44. Any one of these real time devices 44, 44 may for example be a clock providing a time of day signal, a counter providing a signal representing the accumulated count of some variable, a pressure sensor providing a signal representing the value of a detected pressure, a temperature sensor providing a signal representing the value of a detected temperature or any one of a host of other similar such detectors or sensors. The output signals from the devices 44, 44 may either be analog signals or binary coded decimal signals and are all connected to a real time selector and analog to binary coded decimal converter module 46. The real time address signal (R. T. ADD.) is supplied to the module 46 and in response to this the module selects one of the real time devices 44, 44 and transmits its output signal to the output line 48. The signal supplied to the output line 48 is in binary coded digital form and if the signal supplied by the selected real time device 14 is in analog form the module 46 converts it into binary coded decimal form before transmission to the line 48. The line 48 consists of six sets of four conductors each of which sets transmits one binary coded decimal digit, the six individual digits so transmitted being indicated at $D_{11}$ to $D_{16}$ in FIG. 1. The number of digits transmitted depends on the selected real time device 44 and may be either three digits or six digits. If three digits are transmitted such digits may appear as digits $D_{11}$, $D_{12}$ and $D_{13}$ or as $D_{14}$, $D_{15}$ and $D_{16}$. If six digits are transmitted they appear as the illustrated digits $D_{11}$ to $D_{16}$.

The binary coded decimal line 48 is connected to a BCD digit select module 50. In response to enable signals $C_{11}$ to $C_{16}$ also supplied to the module 50 this module at proper times selects one of the digits $D_{11}$ to $D_{16}$ and transmits it to the module 52. More particularly, the digit $D_{11}$ is transmitted during the appearance of enable signal $C_{11}$, the digit $D_{12}$ is transmitted during the appearance of $C_{12}$, and so forth. The module 52 in turn converts the binary coded decimal digit transmtted to it into a nineteen bit binary coded signal. This latter signal is in turn transmitted to the output line 54 and when an associated tri-state buffer 56 is enabled it is injected onto the character buss 26.

The clock means 16 includes an oscillator 58 driving a sixteen state counter 60 having four output terminals connected to the four conductors of the character address line 32, the output of the counter therefore being the character address (CHAR. ADD.) signal which accordingly shifts sequentially through its sixteen different states or addresses. Each cycle through the sixteen different states or addresses of the character address signal therefore defines a time frame having sixteen time slots during each of which slots a different character address appears on the lines. Connected to the output of the counter 60 is a four to one of sixteen decoder 62 which decodes the character address signal into one of sixteen enabling signals $C_1$ to $C_{16}$ supplied to respectively associated enable terminals 28, 28 of the display device 10. The enable signals $C_1$ to $C_{16}$ are, of course, produced in synchronism with the sequencing of the character address signal and the connections are such that when the character address signal addresses memory location 1 of the selected message enable signal $C_1$ simultaneously appears and enables character display station number 1 of the display device, when the character address signal addresses memory location 2 of the selected message enable signal $C_2$ simultaneously appears and enables character display station number 2, and so forth.

The enable signals $C_{11}$ to $C_{16}$ and the two reserve signals RES 11-13 and RES 14-16 are also transmitted to a logic circuit 64 consisting of three OR gates 66, 68 and 70 and two AND gates 72 and 73. The circuit 64 functions to produce a RDRT signal on the line 76 when the enable signals $C_{11}$, $C_{12}$ or $C_{13}$ occur simultaneously with reserve signal RES 11-13 and to produce a similar RDRT signal on the line 76 when the enable signals $C_{14}$, $C_{15}$ or $C_{16}$ appear simultaneously with the reserve signal RES 14-16. When the RDRT signal appears it enables the tri-state buffer 56 and disables the tri-state buffer 36 through the inverter 78.

Therefore, when the message selector 18 selects a message fragment from the memory 12 and produces an RES 11-13 signal, to indicate the reservation fo display stations number 11, 12 and 13, each time enable signals $C_{11}$, $C_{12}$ and $C_{13}$ appear in a time frame the tri-state buffer 36 is disabled to disconnect the memory 12 from the character buss 26 and the tri-state buffer 56 is enabled to instead inject the real time signal from the module 52 onto the character buss 26. Simmilary, if the selected message fragment is accompanied by the reserve signal RES 14-16, when the enable signals $C_{14}$, $C_{15}$ and $C_{16}$ appear the buffer 36 is disabled and the buffer 56 is enabled. Of course, it will be understood that when the buffer 56 is enabled during the appearance of enable signal $C_{11}$ the digit select module 50 is also conditioned by the enable signal $C_{11}$ to select digit $D_{11}$, when the buffer 56 is enabled during the appearance of enable signal $C_{12}$ the digit select module 50 is conditions by the enable signal $C_{12}$ to select $D_{12}$ and so forth. The result of this is that when a stored message fragment is selected from the memory 12 by the message address signal, display stations number 1 to 10 will display information derived from the memory. If reserve signal RES 11-13 accompanies the message address signal display stations number 11, 12 and 13 will display real time data derived from a selected one of the real time device 44, 44. If the reserve signal RES 14-16 accompanies the message address signal display stations number 14, 15 and 16 will display real time data derived from a selected real time device 44. If either reserve sigal is not present during the selection of a message fragment, the display stations otherwise reserved by that signal may be used to display information derived from the memory 12. The complete displayed message therefore may consist of a maximum of either ten or thirteen characters derived from the memory and a corresponding maximum of either six or three characters derived from the real time devices 44, 44. When a complete stored message is selected from the memory 12 neither of the reserve signals appear, so that the buffer 36 is enabled and the buffer 56 disabled during each time slot of each frame to cause all sixteen display stations of the display to display information derived from the memory.

Figure 2:
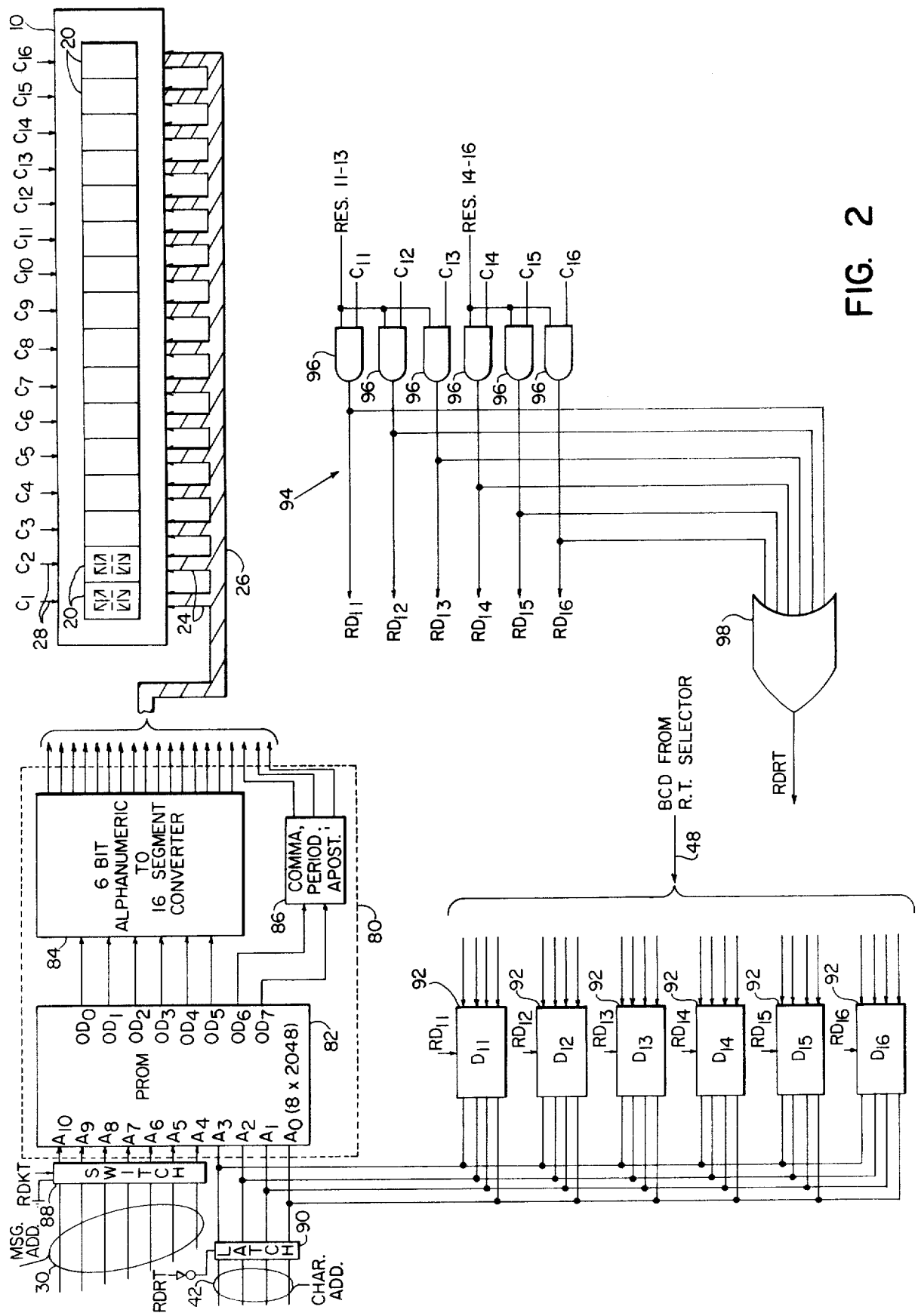
FIG. 2 is a block diagram showing part of a display system comprising another embodiment of this invention, the parts of the system not shown in FIG. 2 being similar to corresponding parts of the FIG. 1 system.

FIG. 2 shows another display system embodying this invention. In this figure the real time signal means 14, the clock means 16 and the message selector 18 have been omitted for convenience, but it should be understood that such components are included in the system and that they may be identical to the corresponding components of FIG. 1. That is, in the system of FIG. 2 a real time signal means, which may be similar to that shown at 14 in FIG. 1 supplies a real time signal, selected from a plurality of such signals, which appears in binary coded decimal form on the line 48. The signal may consist of six digits $D_{11}$ to $D_{16}$, three digits $D_{11}$, $D_{12}$ and $D_{13}$ or three digits $D_{14}$, $D_{15}$ and $D_{16}$. Likewise, a clock means similar to the clock means 16 is included in the FIG. 2 system and provides character address signals on the line 42 and enable signals $C_1$ to $C_{16}$, which character address signals and enable signals synchronously sequence through sixteen states during repetitive time frames in the same manner as discussed in connection with FIG. 1. Also, the message selector similar to the selector 18 of FIG. 1 is included in the FIG. 2 system and provides a message address signal (MSG. ADD.) on the line 30 and, when the selected message is a stored message fragment, either a RES 11-13 signal or an RES 14-16 signal or both depending on which character display stations of the display device 10 are to be reserved for the display of real time characters. The message selector also produces real time address signals (not shown in FIG. 2) which control the selection of the real time signal applied to the line 48.

FIG. 2 differs from FIG. 1 in that the message storing memory is shown in more detail and also in that this message storing memory is additionally used to convert the binary coded decimal digits from the lines 48 into nineteen bit binary coded form for application to the character buss 26.

In the system of FIG. 2 the memory is indicated at 80 and is made basically from two standard components, namely an 8×2048 bit prom 82 and a six bit alphanumeric to sixteen segment converter 84, plus a comma, period, and apostrophe logic circuit 86. The prom 82 has eleven address terminals $A_0$ to $A_{10}$ and eight output data terminals $OD_0$ to $OD_7$. The address terminals $A_4$ to $A_{10}$ are connected to corresponding output terminals of a switch 88 controlled by an RDRT signal. When the RDRT signal is absent the address terminals $A_4$ to $A_{10}$ are connected through the switch 88 to corresponding ones of the conductors of the message address line 30 to receive the message address signal (MSG. ADD.) supplied by the message selector. When the RDRT signal is present, the switch 88 connects all of the address terminals $A_4$ to $A_{10}$ to ground, thereby addressing message number 0000000. The remaining four address terminals $A_0$ to $A_3$ of the prom 82 are connected to the character address line 42 through a latch 90 also controlled by the RDRT signal. When the RDRT signal is absent the latch transmits the character address signal (CHAR. ADD.) appearing on the four conductors of the line 42 to the four address terminals $A_0$ to $A_3$ and when the RDRT signal is present the character address line 42 is disconnected from the address terminals $A_0$ to $A_3$.

The four address terminals $A_0$ to $A_3$ of the prom 82 are also connected in parallel to six latches 92, 92 for the six sets of conductors of the BCD signal line 48. These six latches are in turn controlled respectively enable signals $RD_{11}$ to $RD_{16}$. When the $RD_{11}$ signal appears the associated latch 92 is enabled to transmit the associated digit $D_{11}$ from the line 48 to the address terminals $A_0$ to $A_4$ to the prom, when the $RD_{12}$ signal appears the associated latch 92 is enabled to transmit the associated digit $D_{12}$ to the prom, etc. A logic circuit 94 is provided to produce the $RD_{11}$ to $RD_{16}$ enable signals and the RDRT signal, it consisting of six AND gates 96 and one OR gate 98. From inspection of this circuit it can be seen that the $RD_{11}$, $RD_{12}$ and $RD_{13}$ enable signals are produced respectively during the appearances of the $C_{11}$, $C_{12}$ and $C_{13}$ enable signals when the RES 11-13 signal is present, and likewise the $RD_{14}$, $RD_{15}$ and $RD_{16}$ enable signals are produced during the appearance of the enable signals $C_{14}$, $C_{15}$ and $C_{16}$ when the RES 14-16 signal is present. When the RES 11-13 signal is present the RDRT signal is produced during the appearances of signals $C_{11}$, $C_{12}$ and $C_{13}$ and when the RES 14-16 signal is present the RDRT signal is producing during the appearances of signals $C_{14}$, $C_{15}$ and $C_{16}$.

Each character storage location of the prom 82 has eight binary cells storing eight binary bits which appear at the eight output terminals $OD_0$ to $OD_7$ when that character storage location is addressed through the address terminals $A_0$ to $A_{10}$. Six of the output bits appearing at output terminals $OD_0$ to $OD_5$ represent a stored character in a six bit alphanumeric code and these six bits are transmitted to the six bit alphanumeric to sixteen segment converter 84 which converts the input character into a sixteen segment coded signal applied to an associated sixteen conductors of the character buss 26. The remaining two bits stored at each character storage location, and appearing at prom output terminals $OD_6$ and $OD_7$, determine whether the character defined by the associated bits appearing at output terminals $OD_0$ to $OD_5$ is to be accompanied by a comma, a period, an apostrophe or no such punctuation, and these two bits are transmitted to the logic 86 which converts them to a three-bit code applied to three other conductors of the character buss 26.

The operation of the system of FIG. 2 may now be described as follows. If the message address (MSG. ADD.) signal provided by the message selector and appearing on the message address line 30 addresses a complete stored message the message selector at the same time also produces no RES 11-13 and no RES 14-16 reserve signals and accordingly no RDRT signals are produced in any time slot during repetitive time frames. Therefore throughout all time slots of each time frame the switch 88 and the latch 90 apply the message address signal from the line 30 and the character address from the line 42 to the prom to cause sequential and repetitive outputting of sixteen stored characters from the prom which are applied to the character buss 26 through the converter 84 and logic 86 to in turn cause the generation of characters in the sixteen data display stations of the display device 10. In this connection it should be noted that some character locations of a message may store "blank" characters which correspond to no segments of a display station being illuminated or made visible and which may be used to create empty spaces in the displayed message, but such "blank" characters are nevertheless "characters" as such term is used herein.

If the message addressed by the signal on the message address line 30 is a stored message fragment the message selector also produces either an RES 11-13, an RES 11-14 signal, or both, to reserve display stations number 11, 12 and 13, or display stations number 14, 15 and 16, or all six display stations number 11 through 16 for the display of real time data. For example, assume that in addition to selecting a stored message fragment the message selector also produces an RES 14-16 signal. Then in each time frame during the appearances of enable signals $C_1$ through $C_{13}$ the RDRT signal is absent and stored characters will be output from the prom 82 and applied to the character buss 26 in the same manner as described above. However, during time slots defined by enable signals $C_{14}$, $C_{15}$ and $C_{16}$ an RDRT signal is produced and also produced are corresponding enable signals $RD_{14}$, $RD_{15}$ and $RD_{16}$. The appearance of the RDRT signal at the switch 88 conditions the switch to connect all address terminals $A_4$ to $A_{10}$ to ground to call for stored message number 0000000. The message stored at this message address is a decoding message for converting a digit applied in binary coded decimal form to the address terminals $A_0$ to $A_3$ to the same digit in a six bit alphanumeric code appearing at the output terminals $OD_0$ to $OD_5$. Accordingly, when a particular binary coded decimal digit is applied to the $A_0$ to $A_3$ terminals the same digit appears at the output terminals $OD_0$ to $OD_5$ in six bit alphanumeric form.

The RDRT signal also opens the latch 90 to disconnect the character address signal on the line 42 from the address terminals $A_0$ to $A_3$. During the time slot defined by enable signal $C_{14}$ the $RD_{14}$ signal enables the latch 92 for digit $D_{14}$ to cause that digit in binary coded decimal form to be applied to the address terminals $A_0$ to $A_3$. Since the prom is now set to the decoding message the same digit appears at output terminals $OD_0$ to $OD_5$ in six bit alphanumeric form and in this form is transmitted to the convertor 84 which converts it to sixteen segment form for application to the character buss 26 through which it is routed to the number 14 display station of the display device by the then appearing enable signal $C_{14}$. Similarly, during the time slots defined by enable signals $C_{15}$ and $C_{16}$ the digits $D_{15}$ and $D_{16}$ are converted from BCD to six bit alphanumeric form by the prom, converted to sixteen segment form by the converter 84 and applied to the character buss 26 to generate representations thereof in display stations number 15 and 16 of the display device. The final result therefore is that the display 10 will display a message consisting of a stored message fragment appearing in display stations number 1 to 13 and of a real time message fragment appearing in display stations 14, 15 and 16.

If reserve signal RES 11-13 appears with the message address signal, instead of reserve signal RES 14-16, then the operation is the same as described for the appearance of reserve signal RES 14-16 except that the real time fragment of the displayed message will appear in display stations numbers 11, 12 and 13. If both reserve signals RES 11-13 and RES 14-16 appear along with the selected message address then the operation again is substantially as described except that each displayed message will have real time data displayed in display stations 11 through 16.

I claim:

1. A system for displaying messages, said system comprising:
   (a) a unitary visual display device having a plurality of character stations at each of which stations any one of a given set of characters may be displayed by the application thereto of a set of binary coded signals,
   (b) a memory having means for storing a plurality of stored message fragments each consisting of a plurality of stored sets of binary coded signals representing a corresponding plurality of characters,
   (c) a real time signal means associated with a plurality of real time conditions and providing a selection of real time message fragments each of which real time message fragments corresponds to a respective one of said real time conditions and each of which real time message fragments consists of at least one real time set of binary coded signals representing at least one character, each of said real time message fragments varying in time with variations in the value of its corresponding real time condition so as to represent at any given instant the instantaneous value of said corresponding condition,
   (d) a message selector having means for simltaneously selecting one of said stored message fragments and one of said real time message fragments, and
   (e) routing means for substantially simultaneously applying said stored sets of binary coded signals of said selected stored message fragment to corresponding first ones of said character stations in a one-signal-set-to-a-one-character-station manner such that each stored set of binary coded signals is transmitted directly to its corresponding character station without being transmitted to any other of said character stations and for applying substantially simultaneously with the applicaton of said stored sets of binary coded signals to said first ones of said character stations said at least one set of binary coded signals of said selected real time message fragment to a corresponding at least one other of said character stations different from said first ones of said character stations in a one-signal-set-to-a-one-character-station manner such that each real time set of binary coded signals is transmitted directly to its corresponding character station without being transmitted to any other of said character stations to cause said device to immediately display a complete unitary visual message made up in part of characters derived from said selected stored message fragment and in part of at least one character derived from said selected real time message fragment, and which at least one character derived from said selected real time message fragment may vary independently of the characters derived from said selected stored message fragment in keeping with variations in the value of the corresponding real time condition.

2. A system for displaying messages as defined in claim 1 further characterized by said real time signal means providing a plurality of real time message fragments each consisting of a plurality of real time sets of binary coded signals representing a corresponding number of characters, and said routing means including means for applying said plurality of real time sets of binary coded signals to a corresponding plurality of said character stations different from the stations to which said plurality of stored sets of binary coded signals are applied.

3. A system for displaying messages as defined in claim 1 further characterized by said routing means being a multiplexing means for repetitively applying the plurality of sets of binary coded signals making up a complete message to the corresponding character stations of said display device.

4. A system for displaying messages as defined in claim 1 further characterized by each of said character stations of said display device having a set of data input terminals and each of said character stations having an enable terminal which may be supplied with an enable signal to enable the signal appearing at its data input terminal to enter the station to produce a visual character, and said routing means including a data buss connected to the input terminal sets of all of said character stations, means for sequentially applying the sets of coded binary signals making up a complete message to said data buss, and means for sequentially applying an enable signal to said enable terminals of said character stations in phase with the application of said sets of binary coded signals to said data buss.

5. A system for displaying messages as defined in any one of claims 1 to 4 further characterized by said memory also having means for storing at least one complete message consisting of a plurality of stored sets of binary coded signals representing a corresponding plurality of characters, said message selector also having means for selecting said at least one complete message stored by said memory, and said routing means including means for applying the stored sets of binary coded signals of a selected stored complete message to corresponding ones of said character stations to cause said display device to display a complete visual message made up entirely of characters derived from the selected stored complete message.

6. A system for displaying messages as defined in claim 5 further characterized by said stored sets of binary coded signals representing said at least one complete message being equal in number to the number of character stations of said visual display device.

7. A system for displaying messages, said system comprising:
   (a) a unitary visual display device having a plurality of character stations at each of which stations any one of a given set of characters may be displayed by the application thereto of a set of binary coded signals,
   (b) a memory having means for storing at least one stored message fragment consisting of a plurality of stored sets of binary coded signals representing a corresponding plurality of characters which plurality of characters is smaller in number than the number of said character stations, and said memory also having means for storing a plurality of complete messages each consisting of a plurality of stored sets of binary coded signals,
   (c) a real time signal means associated with at least one real time condition and providing at least one real time message fragment consisting of at least one real time set of binary coded signals representing at least one character, each of said real time message fragments varying in time with variations in the value of its corresponding real time condition so as to represent at any given instant the instantaneous value of said corresponding condition,
   (d) a message selector having means for simultaneously selecting one of said at least one stored message fragments and one of said at least one real time message fragments or, in the alternative, for selecting one of said complete stored messages, and
   (e) routing means operable in the event said message selector selects a stored message fragment and a real time message fragment for substantially simultaneously applying the sets of binary coded signals of the selected stored message fragment to corresponding first ones of said character stations in a one-signal-set-to-a-one-character-station manner such that each stored set of binary coded signals is transmitted directly to its corresponding character station without being transmitted to any other of said character stations and for applying substantially simultaneously with the application of said stored sets of binary coded signals to said first ones of said character stations the at least one set of binary coded signals of the selected real time message fragment to a corresponding at least one other of said character stations different from said first ones of said character stations in a one-signal-set-to-a-one-character-station manner such that each real time set of binary coded signals is transmitted directly to its corresponding character station without being tansmitted to any other of said character stations to cause said device to immmediately display a complete unitary visual message made up in part of characters derived from said selected stored message fragment and in part of at least one character derived from said selected real time message fragment, and which at least one character derived from said selected real time message fragment may vary independently of the characters derived from said selected stored message fragment in keeping with variations in the value of the corresponding real time condition, said routing means also being operable when a complete stored message is selected by said message selector for applying in a one-signal-set-to-a-one-character-station manner such that each stored set of binary coded signals is transmitted directly to its corresponding character station without being transmitted to any other of said character stations the plurality of sets of binary coded signals comprising said complete stored message to corresponding ones of said character stations to cause said display device to immediately display a complete visual message made up entirely of characters derived from said selected complete stored message.

8. A system for displaying messages as defined in claim 7 further characterized by said stored sets of binary coded signals representing said at least one complete message being equal in number to the number of character stations of said visual display device.

9. A system for displaying messages as defined in claim 7 or claim 8 further characterized by said memory having means for storing a plurality of stored message fragments, and said real time signal means having means providing a selection of real time message fragments.

10. A system for displaying messages as defined in claim 9 further characterized by each of said selection of real time message fragments consisting of a plurality of sets of binary coded signals representing a corresponding plurality of characters.

11. A system for displaying messages, said system comprising:
   (a) a unitary visual display device having a plurality of character stations at each of which stations any one of a given set of characters may be displayed by the application thereto of a set of binary coded signals, said visual display device having a character buss to which a set of binary signals may be applied, a plurality of enable terminals each associated with a respective one of said character stations, and means operable in response to the application of an enable signal to any one of said enable terminals for applying the set of binary coded signals then appearing on said buss to the character station corresponding to said one enable terminal, (b) a clock means defining repetitive time frames each divided into a plurality of successive character time slots defined by a successive plurality of character enable signals each applied to the enable terminal of a respective one of said character stations, (c) a memory having means for storing a plurality of stored message fragments each consisting of a plurality of stored sets of binary coded signals representing a corresponding plurality of characters, (d) a real time signal means associated with a plurality of real time conditions and providing a selection of real time message fragments each of which real time message fragments corresponds to a respective one of said real time conditions and each of which real time message fragments consists of a plurality of real time sets of binary coded signals representing a plurality of real time characters, each of said real time message fragments varying in time with variations in the value of its corresponding real time condition so as to represent at any given instant the instantaneous value of said corresponding condition, (e) a message selector having means for simultaneously selecting one of said stored message fragments and one of said real time message fragments, and (f) means operable during each frame for successively applying said stored sets of binary coded signals to said buss in synchronism with some of said enable signals and means operable during each frame for successively applying said plurality of real time binary coded signals to said buss in synchronism with other of said enable signals.

12. A system for displaying messages, said system comprising:

(a) a unitary visual display device having a plurality of character stations at each of which stations any one of a given set of characters may be displayed by the application thereto of a set of binary coded signals, said device having a character buss to which such a set of binary coded signals may be applied, a plurality of enable terminals each associated with a respective one of said character stations, and means operable in response to the application of an enable signal to any one of said enable terminals for applying the set of binary coded signals then appearing on said buss to the character station corresponding to said one enable terminal, (b) a memory having means for storing a plurality of messages addressable through a set of message address terminals, said memory having for each of said messages a plurality of storage locations addressable through a set of character address terminals which plurality of storage locations is equal in number to the number of character stations of said visual display device and at each of which storage locations a set of binary coded signals representing a character may be stored, some of said stored messages being complete messages and some others being message fragments, (c) a clock means defining repetitive time frames each divided into a plurality of successive character time slots defined by a successive plurality of character enable signals each applied to the enable terminal of a respective one of said character stations, (d) a real time signal means associated with a plurality of real time conditions and providing a selection of real time message fragments each of which real time message fragments corresponds to a respective one of said real time conditions and each of which real time message fragments consists of at least one real time set of binary coded signals representing at least one character, each of said real time message fragments varying in time with variations in the value of its corresponding real time condition so as to represent at any given instant the instantaneous value of said corresponding condition, (e) a message selector providing a selectively variable set of message address signals for application to said message address terminals of said memory for selecting one of the messages stored in said memory, said message selector also including means for producing a real time condition selecting signal selecting one of said real time message fragments of said real time sensing means and means for producing a reserve signal when the stored message addressed by the set of message address signals selected by said message selector is a message fragment, (f) character addressing means synchronized with said clock means and providing a sequentially varying set of character address signals applied to said character address terminals of said memory during successive ones of said time slots to sequentially address the character locations of the addressed message in synchronism with said enable signal so that when the ith character location of a message is addressed the ith character station of said visual display device is exclusively enabled, (g) means responsive to the absence of said reserve signal for applying to said character buss binary coded signals stemming from said memory during the occurrence of all of said enable signals of each frame whereby the total displayed message is made up entirely of a stored message derived from said memory, and (h) means responsive to the presence of said reserve signal for applying to said character buss binary coded signals stemming from said memory during the occurrence of some of said enable signals of each frame and for applying to said character buss binary coded signals stemming from the real time condition selected by said real time condition selecting signal during the occurrence of other of said enable signals of each frame whereby the total displayed message is made up in part of a stored message fragment derived from said memory and in part of a real time message fragment derived from said real time conditions.

13. A system for displaying messages as defined in claim 12 further characterized by said real time signal means including means for providing for the real time condition selected by said real time condition selecting signal a real time message fragment consisting of a plurality of digits in binary coded decimal form, said memory having one decoding message wherein the data stored at the various storage locations of the memory associated with that message are such that when a binary coded decimal signal is applied to said character select terminals the output from said memory defines the digit repesented by said binary coded decimal signal in the same code as other characters output from said memory when other messages are addressed, means forcing said message address terminals to the address of said decoding message when said reserve signal is present and during the occurrence of time slots reserved by said reserve signal, and means operable when said reserve signal is present and during the occurrence of time slots reserved by said reserve signal for successively applying said plurality of binary coded decimal digits to said character address terminals to the exclusion of character address signals from said character addressing means.

14. A system for displaying messages as defined in claim 12 or claim 13 further characterized by each of said display stations of said visual display having n segments each of which may be individually made visible or not visible and which are arranged so that by simultaneously making visible different combinations of segments different characters may be formed, and said memory at each of said storage locations having n binary cells storing a binary signal having n bits associated respectively with the n segments of a diaplay station and coding a character in accordance with the visible state or non-visible state of each of such n segments as required to form that character at the display station.

15. A system for displaying messages as defined in claim 12 or claim 13 further characterized by each of said display stations of said visual display having n segments each of which may be individually made visible or not visible and which are arranged so that by simultaneously making visible different combinations of segments different characters may be formed, said memory at each of said storage locations having x binary cells storing a character in an x bit code where x is less then n, and a code converter between said memory and said buss for converting the characters output from said memory in said x bit code into an n bit code wherein the n bits of each character correspond respectively to said n segments of a display station.

* * * * *